United States Patent
Choi

(10) Patent No.: US 10,674,333 B2
(45) Date of Patent: Jun. 2, 2020

(54) SYSTEM FOR VERIFYING VEHICLE-BASED COMMUNICATION SERVICE

(71) Applicant: HYUNDAI MOBIS CO., LTD., Seoul (KR)

(72) Inventor: A Ra Choi, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 226 days.

(21) Appl. No.: 14/925,502

(22) Filed: Oct. 28, 2015

(65) Prior Publication Data

US 2016/0119419 A1 Apr. 28, 2016

(30) Foreign Application Priority Data

Oct. 28, 2014 (KR) .................. 10-2014-0147426

(51) Int. Cl.
*B60K 35/00* (2006.01)
*H04W 4/40* (2018.01)
*H04W 4/029* (2018.01)
*G07C 5/00* (2006.01)
*H04L 29/08* (2006.01)

(52) U.S. Cl.
CPC .............. *H04W 4/40* (2018.02); *B60K 35/00* (2013.01); *G07C 5/008* (2013.01); *H04W 4/029* (2018.02); *H04L 67/125* (2013.01)

(58) Field of Classification Search
CPC ..... H04L 41/069; H04L 43/045; H04L 67/12; H04L 41/0677; G06F 17/30864
See application file for complete search history.

(56) References Cited

U.S. PATENT DOCUMENTS

| 9,221,463 B2* | 12/2015 | Choi ................. B60W 30/146 |
| 9,525,556 B2* | 12/2016 | Park ..................... H04L 67/12 |
| 10,019,299 B2* | 7/2018 | Park ..................... B60W 30/12 |
| 2003/0105918 A1* | 6/2003 | Plourde, Jr. ........ G06F 17/30017 711/112 |
| 2006/0167935 A1* | 7/2006 | Atarashi ................ G01C 21/32 |
| 2011/0054823 A1 | 3/2011 | Long et al. |

(Continued)

FOREIGN PATENT DOCUMENTS

| CN | 1481631 A | 3/2004 |
| CN | 101868767 A | 10/2010 |

(Continued)

OTHER PUBLICATIONS

Chinese Office Action dated Apr. 3, 2018 in counterpart Chinese Patent Application No. 201510714002.1 (7 pages in Chinese).

*Primary Examiner* — Donald J Wallace
(74) *Attorney, Agent, or Firm* — NSIP Law

(57) ABSTRACT

Provided is a system for verifying a vehicle-based communication service through simulation based on various environments. The system includes a first terminal configured to receive log data and output data from a vehicle terminal equipped in each of a plurality of vehicles, transmit the log data and a reproduction command signal corresponding to the log data, and display the output data and a second terminal configured to receive the log data from the first terminal to upload the log data, perform synchronization of a corresponding system time, and adjust a reproduction time of each of pieces of log data to a predetermined reference point according to the reproduction command signal.

16 Claims, 13 Drawing Sheets

(56) References Cited

U.S. PATENT DOCUMENTS

| | | | |
|---|---|---|---|
| 2011/0164562 A1* | 7/2011 | Qiu | H04W 72/1236 |
| | | | 370/328 |
| 2013/0201316 A1* | 8/2013 | Binder | H04L 67/12 |
| | | | 348/77 |
| 2013/0261947 A1* | 10/2013 | Yamashiro | G08G 1/137 |
| | | | 701/300 |
| 2013/0342368 A1 | 12/2013 | Nathanson | |
| 2014/0005880 A1* | 1/2014 | Guenkova-Luy | H04L 41/069 |
| | | | 701/31.4 |
| 2014/0170602 A1* | 6/2014 | Reed | G09B 19/167 |
| | | | 434/62 |
| 2014/0288728 A1 | 9/2014 | Tsuchida et al. | |
| 2017/0099177 A1* | 4/2017 | Tsuchida | H04L 41/069 |
| 2017/0221357 A1 | 8/2017 | Nathanson | |

FOREIGN PATENT DOCUMENTS

| | | |
|---|---|---|
| CN | 103529818 A | 1/2014 |
| CN | 104065699 A | 9/2014 |

\* cited by examiner

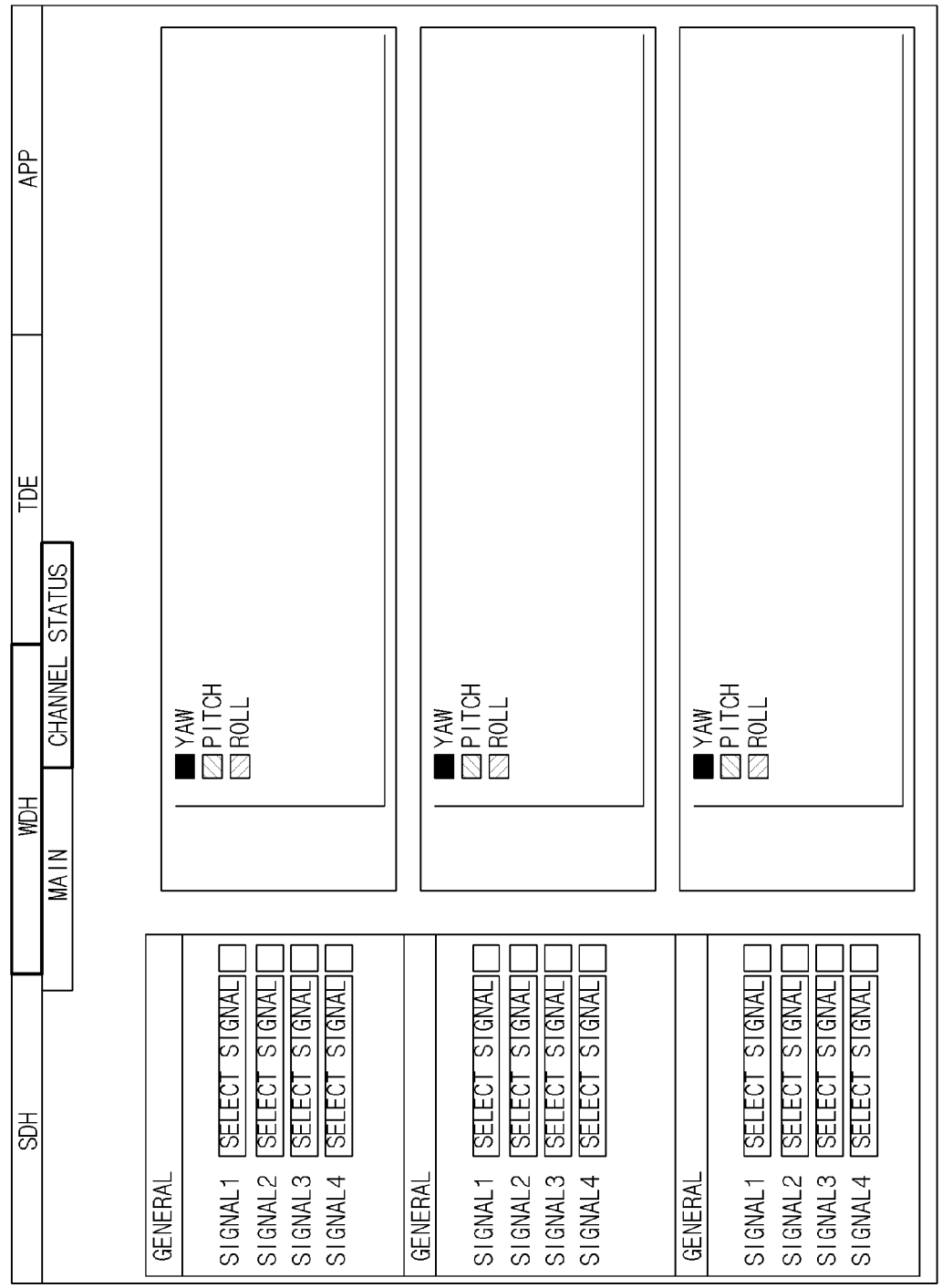

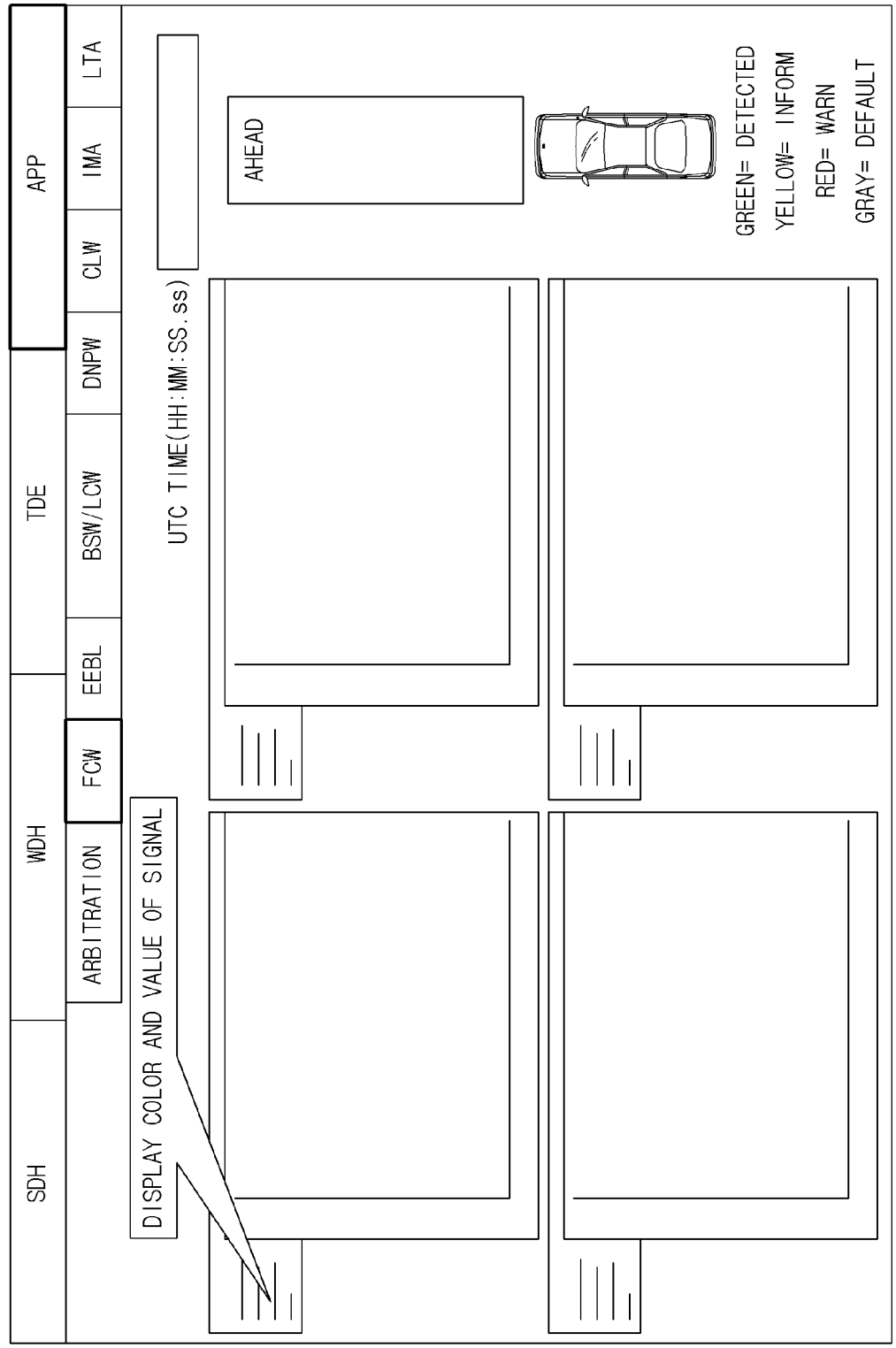

US 10,674,333 B2

SYSTEM FOR VERIFYING VEHICLE-BASED COMMUNICATION SERVICE

CROSS-REFERENCE TO RELATED APPLICATIONS

This application claims priority under 35 U.S.C. § 119 to Korean Patent Application No. 10-2014-0147426, filed on Oct. 28, 2014, the disclosure of which is incorporated herein by reference in its entirety.

TECHNICAL FIELD

The present invention relates to a system for verifying a vehicle-based communication service through simulation based on various environments.

BACKGROUND

Recently, as a car distribution rate increases rapidly, a safety-related issue becomes increasingly more important. A system for preventing a traffic accident is being researched and developed. Particularly, proposed has been technology associated with a quick braking warning service, a forward collision warning service, and an emergency vehicle priority signal control service which are provided by using vehicle-to-vehicle (V2V) communication based on wireless access in vehicular environments (WAVE).

Vehicle-to-everything (V2X) technology has been proposed as technology for automatically controlling a vehicle and supporting safe driving, in addition to vehicle automatically recognizing a vehicle-driving environment and providing the recognized vehicle-driving environment to a driver.

A V2X service allows a safety warning and traffic information to be shared and thus has a better effect of preventing an accident or a traffic jam than a related art communication system for vehicles. Therefore, in order to optimize the V2X service to a traffic system, an environment for obtaining a high-reliability result should be provided by simulating the V2X service in various environments. Vector CANoe, Vector CANape, etc. of the related art relate to simulation relevant to vehicles, but have a limitation in performing communication by connecting a plurality of terminals and cannot perform synchronization of a whole system.

SUMMARY

Accordingly, the present invention provides a system that performs communication by connecting a plurality of vehicle terminals applied to a vehicle-based communication service, performs synchronization of a whole system, and verifies a service through a simulation of a V2X service in various environments.

In one general aspect, a system for verifying a vehicle-based communication service includes: a first terminal configured to receive log data and output data from a vehicle terminal equipped in each of a plurality of vehicles, transmit the log data and a reproduction command signal corresponding to the log data, and display the output data; and a second terminal configured to receive the log data from the first terminal to upload the log data, perform synchronization of a corresponding system time, and adjust a reproduction time of each of pieces of log data to a predetermined reference point according to the reproduction command signal.

Other features and aspects will be apparent from the following detailed description, the drawings, and the claims.

BRIEF DESCRIPTION OF THE DRAWINGS

FIGS. 5 to 8 are exemplary diagrams illustrating a vehicle information tab of a display unit according to an embodiment of the present invention.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

Figure 1:
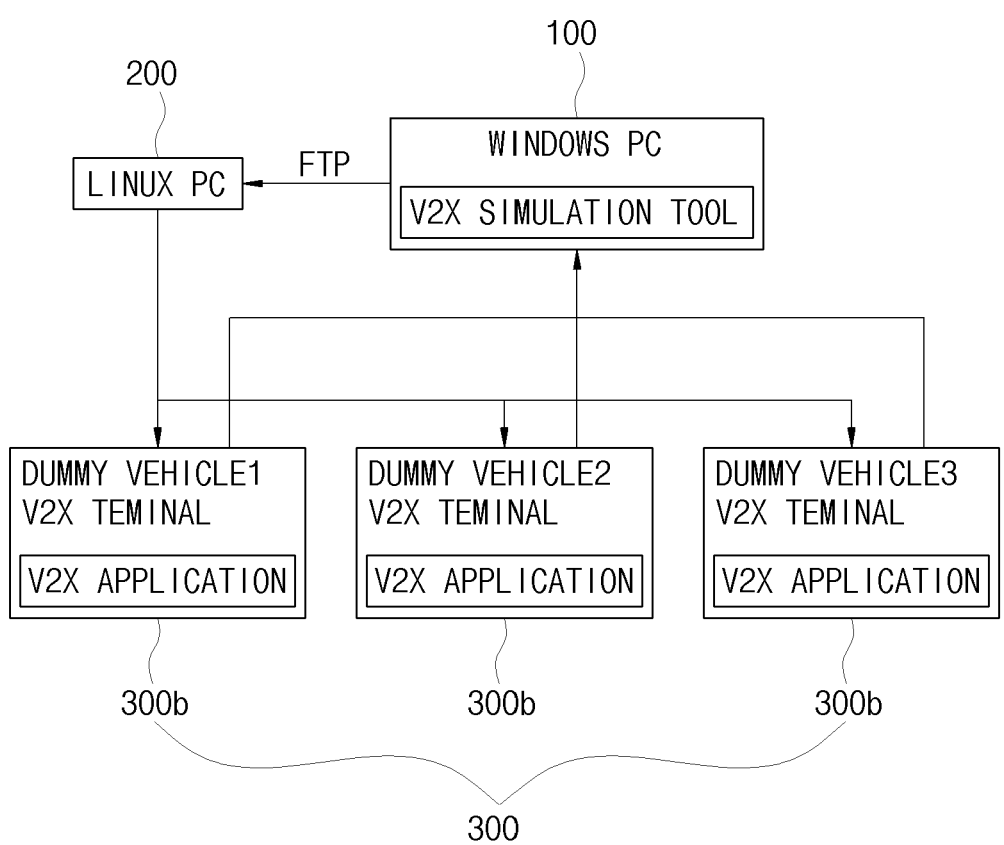
FIG. 1 is a block diagram illustrating a communication operation of a vehicle-based communication service verification system according to an embodiment of the present invention.
Figure 2:
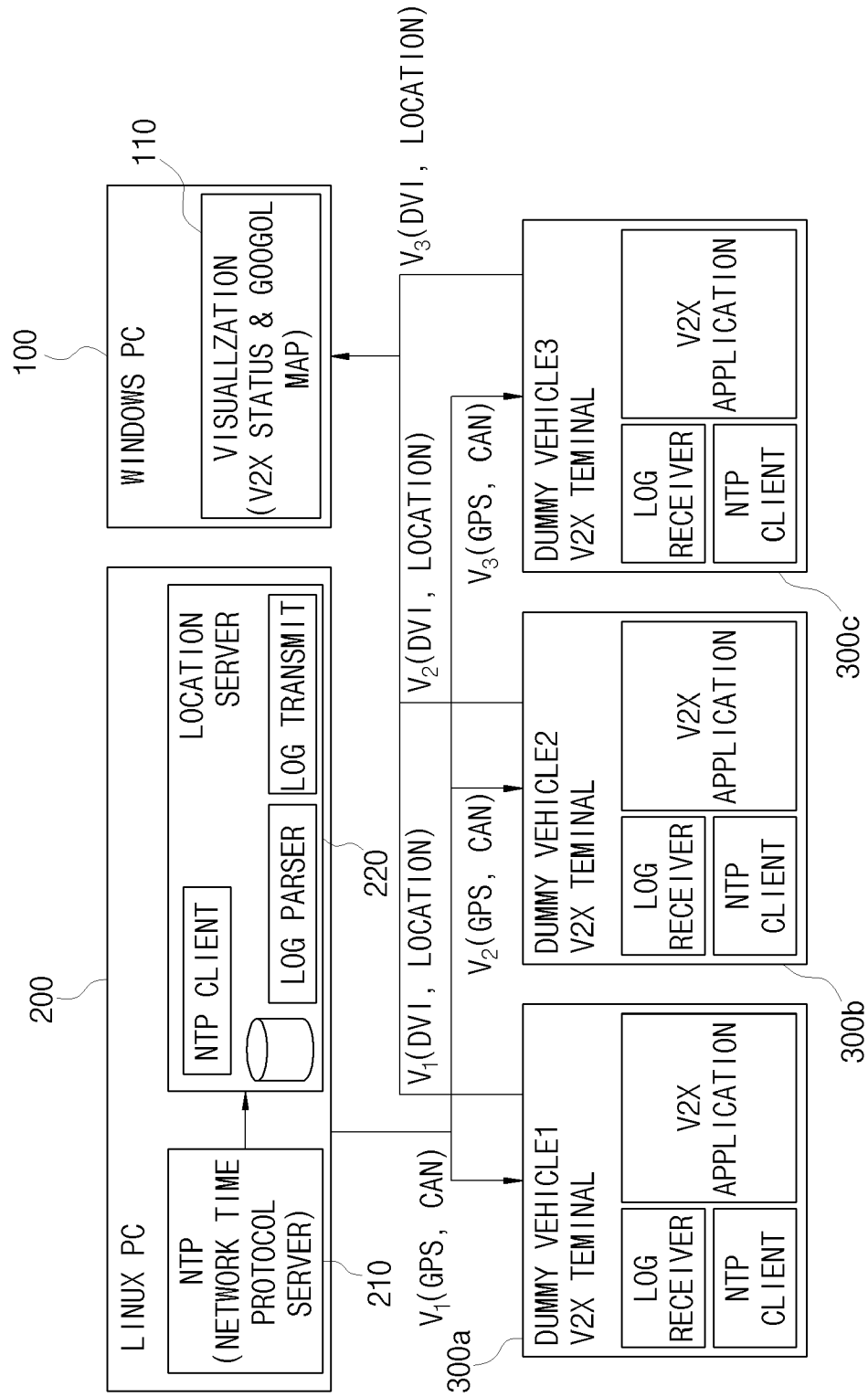
FIG. 2 is a block diagram illustrating a configuration of the vehicle-based communication service verification system according to an embodiment of the present invention.

FIG. 1 is a block diagram illustrating a communication operation of a vehicle-based communication service verification system according to an embodiment of the present invention. FIG. 2 is a block diagram illustrating a configuration of the vehicle-based communication service verification system according to an embodiment of the present invention.

As illustrated in FIGS. 1 and 2, the vehicle-based communication service verification system according to an embodiment of the present invention may include a first terminal 100, which receives log data and output data from a vehicle terminal 300 equipped in each of a plurality of vehicles, transmits the log data and a reproduction command signal corresponding to the log data, and displays the output data, and a second terminal 200 that receives the log data from the first terminal 100 to upload the log data, performs synchronization of a corresponding system time, and adjusts a reproduction time of each of pieces of log data according to the reproduction command signal.

The vehicle terminal 300 according to an exemplary embodiment of the present invention may transmit the log data to the first terminal 100, and the first terminal 100 may upload the transmitted log data to the second terminal 200 through an FTP server. In this case, the first terminal 100 may be a personal computer (PC) based on a Windows operating system (OS), and the second terminal 200 may be a PC based on a Linux OS.

A system time of the second terminal 200 (a Linux PC) according to an embodiment of the present invention may be a time synchronized with an embedded network time protocol (NTP) server.

When the first terminal 100 transmits the reproduction command signal corresponding to the log data, the second terminal 200 may receive the reproduction command signal through a User Datagram Protocol (UDP) communication and may adjust an initial value of the log data to identically adjust reproduction times of pieces of log data.

Figure 3:
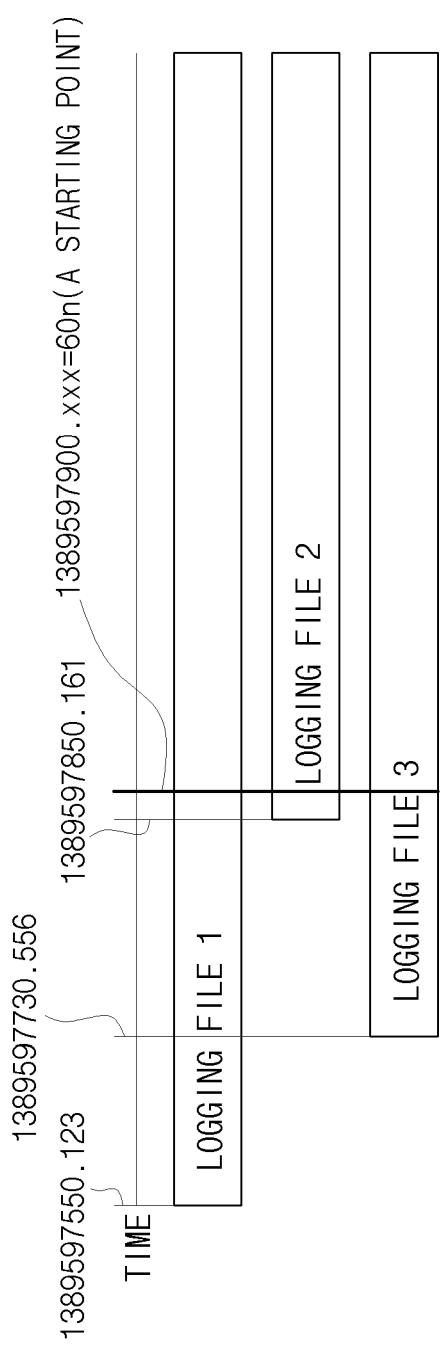
FIG. 3 is an exemplary diagram illustrating an operation of adjusting a log data reproduction time according to an embodiment of the present invention.

That is, as illustrated in FIG. 3, with respect to log data "logging file 2" having a latest logging start time among pieces of log data "logging file 1, logging file 2 and logging file 3" transferred from the first terminal 100, the second terminal 200 may identically adjust reproduction times of the pieces of log data according to a predetermined method. In an embodiment, the second terminal 200 may identically adjust the reproduction times of the pieces of log data to 60 times reproduction time with respect to a logging start time of the log data having the latest logging start time.

The second terminal 200 according to an embodiment of the present invention may transmit reproduced data to the vehicle terminal 300, and the vehicle terminal 300 may transmit output data through middleware, which is data associated with a safety service, to the first terminal 100 according to the reproduced data being received. A display unit 110 of the first terminal 100 may display, to a user, a result value based on various output data by using a simulation tool.

Figure 4:
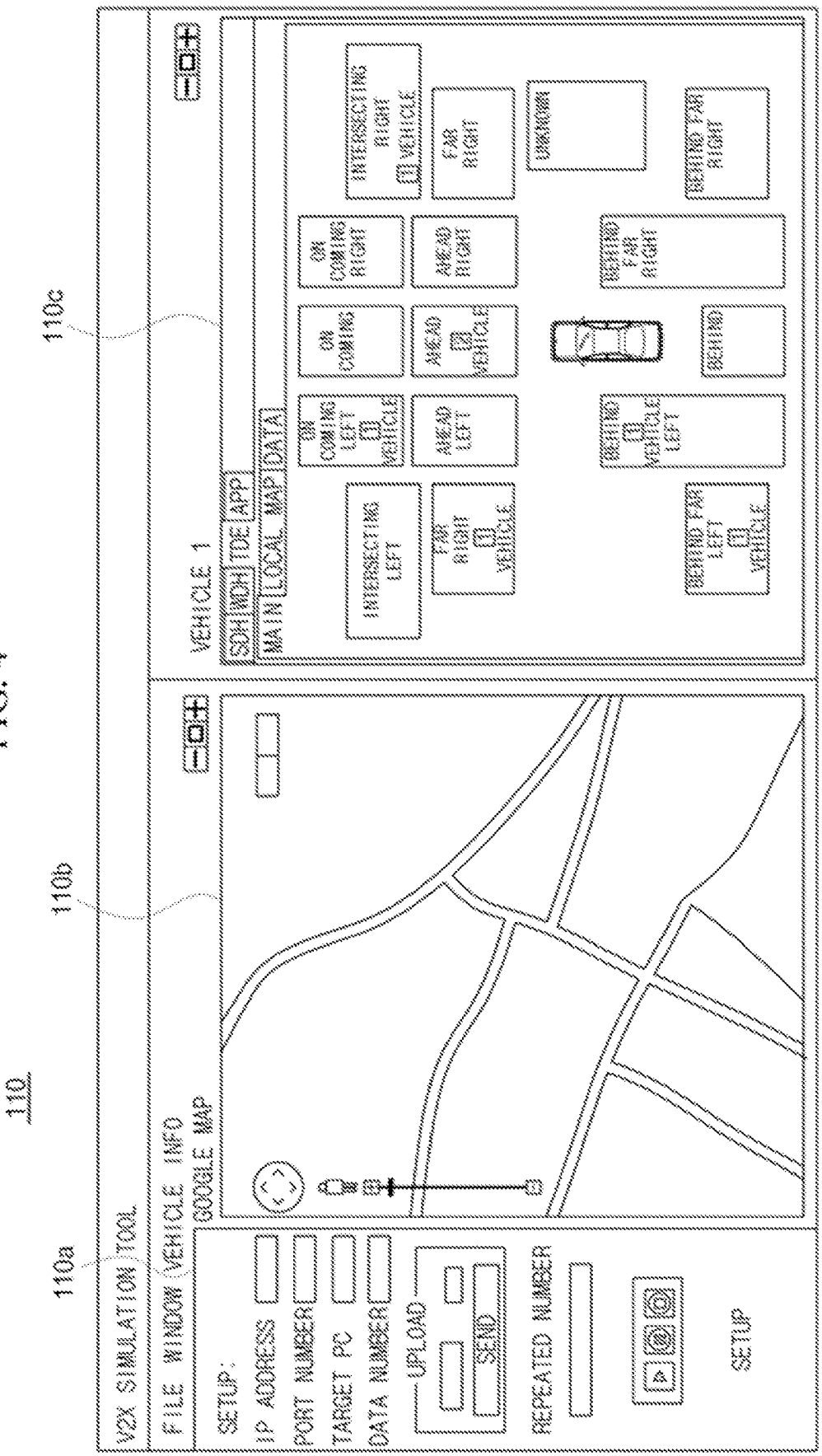
FIG. 4 is an exemplary diagram illustrating a display unit of a first terminal according to an embodiment of the present invention.

FIG. 4 is an exemplary diagram illustrating the display unit 110 of the first terminal 100 according to an embodiment of the present invention. FIGS. 5 to 8 are exemplary diagrams illustrating a vehicle information tab, or window, of the display unit 110 according to an embodiment of the present invention.

According to an embodiment of the present invention, the display unit 110 of the first terminal 100 may display a setup tab 110*a* which displays setup information including an Internet protocol (IP) address and a port number, a map information tab 110*b*, and a vehicle information tab 110*c*. In this case, the vehicle information tab 110*c* may be opened by the number of logs of a vehicle whose log data is reproduced.

The setup tab 110*a* may include an IP address region, a port number region, a target PC region, a data number region, an upload/send button, a repetition number region, and a play/pause/stop button. An IP address of a Windows PC which is the first terminal 100 may be input through the IP address region, a port number input window of the first terminal 100 may be provided in the port number region, and an address for FTP connection may be input through the target PC region. Numbers of logging files may be input through the data number region, and the upload/send button for transmitting logging data to the second terminal 200 may be provided. Also, a window for the number of number repetitions of the logging data may be provided, and control information about the second terminal 200 may be received, by using the play/pause/stop button, from the first terminal 100 which controls a whole system.

Moreover, a map or navigation program, for example Google maps, may be displayed on the map information tab 110*b*, and a map enlarging/reducing function may be provided in the map information tab 110*b*.

Figure 5A:
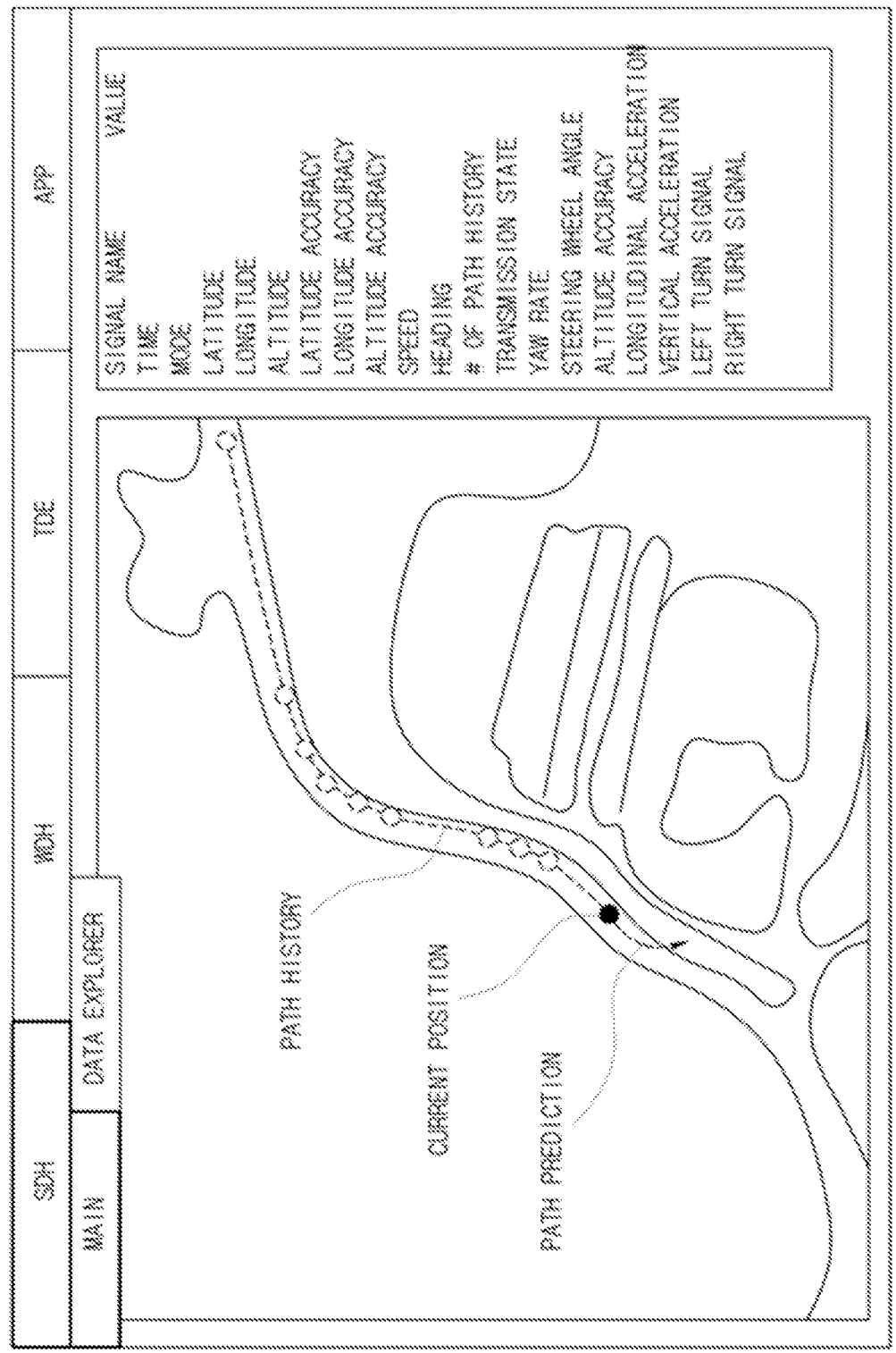
Figure 6A:
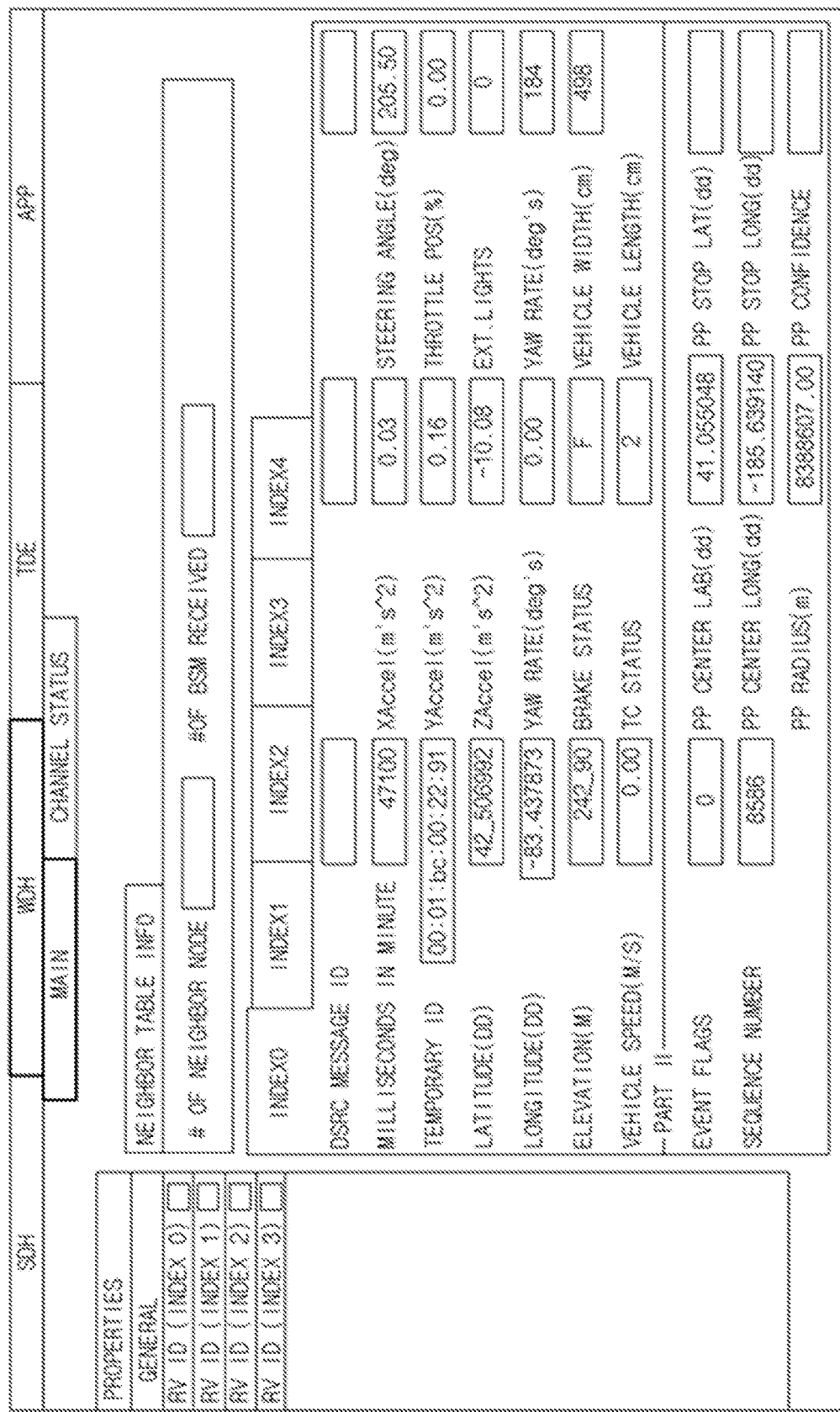
Figure 7A:
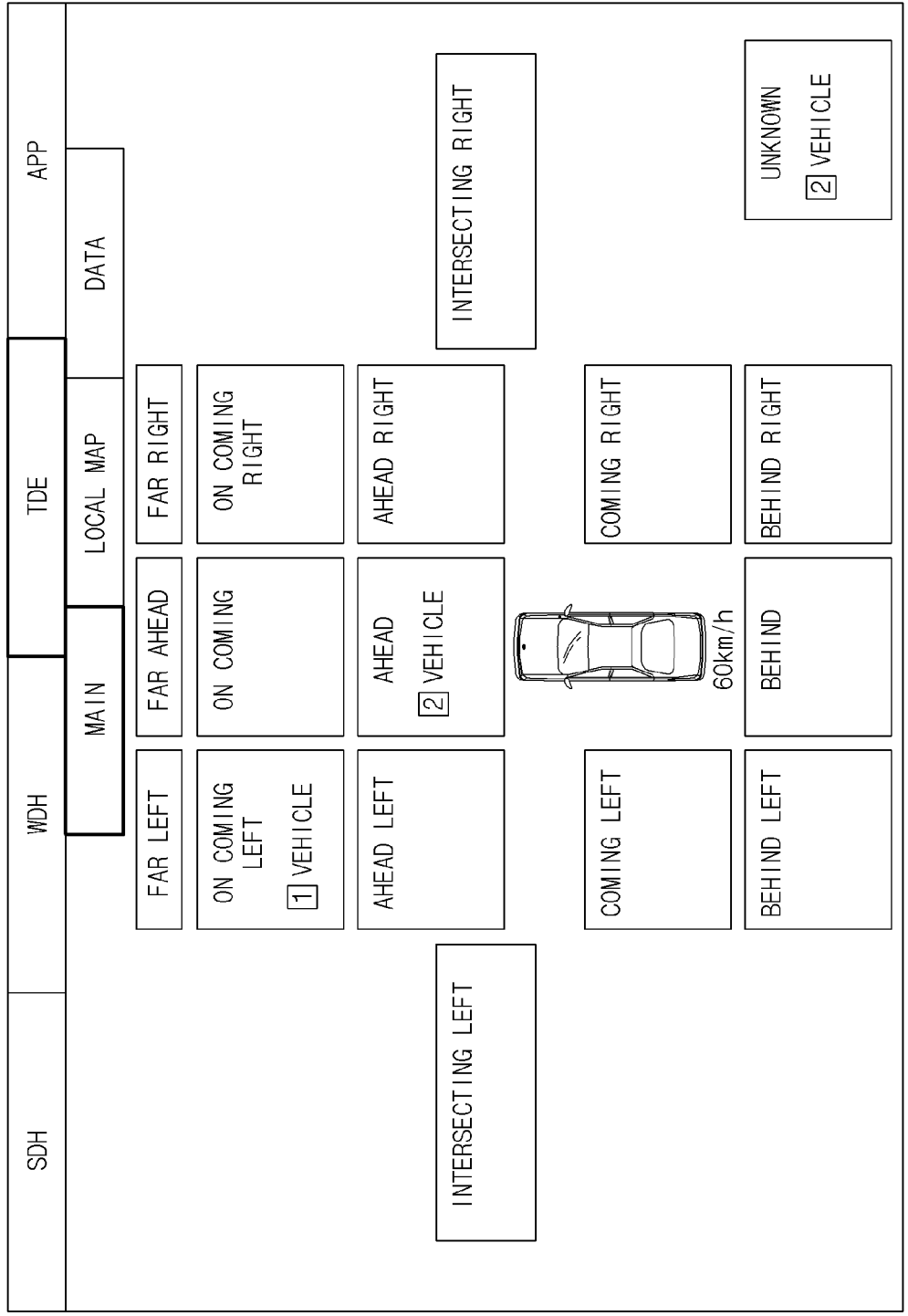
Figure 7B:
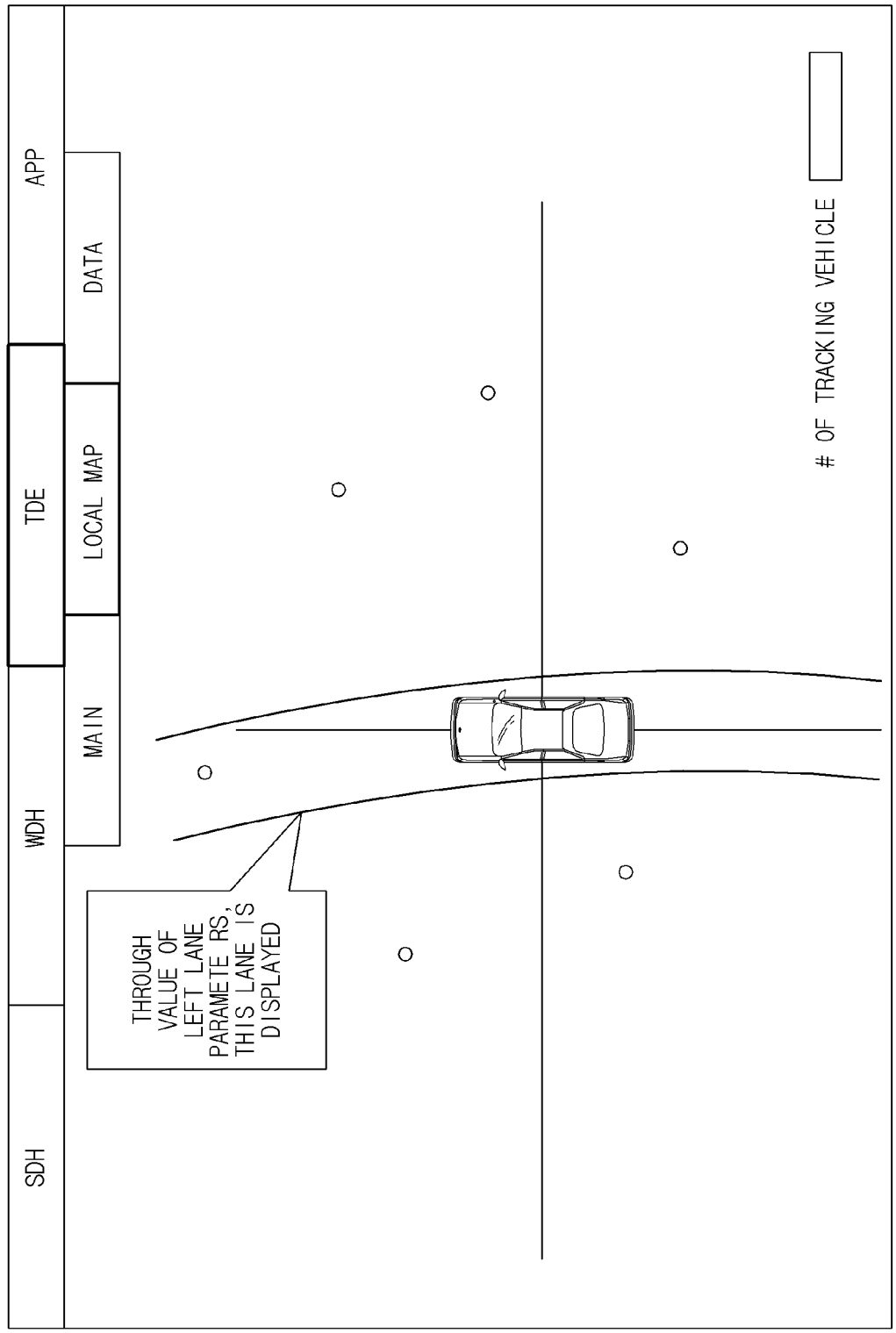
Figure 7C:
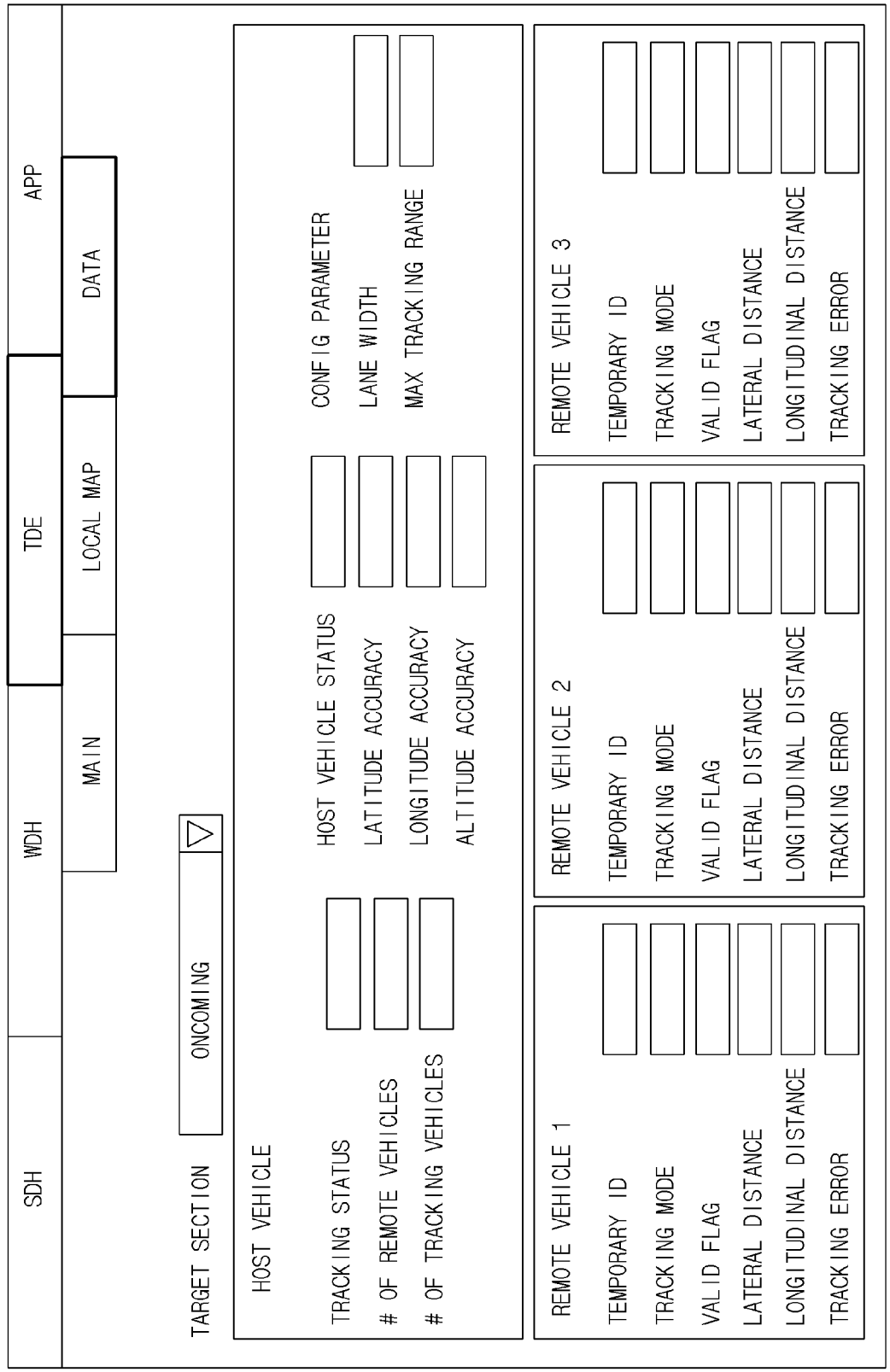

Moreover, the vehicle information tab 110*c* may include at least one of a tab that displays a current vehicle position, a route history, and an expectation route illustrated in FIG. 5*a*, a tab that displays information of peripheral vehicles received through WAVE communication illustrated in FIG. 6*a* and FIG. 6*b*, and a tab that displays position information of a tracked vehicle around a vehicle illustrated in FIG. 7*a* through FIG. 7*c*.

Figure 5B:
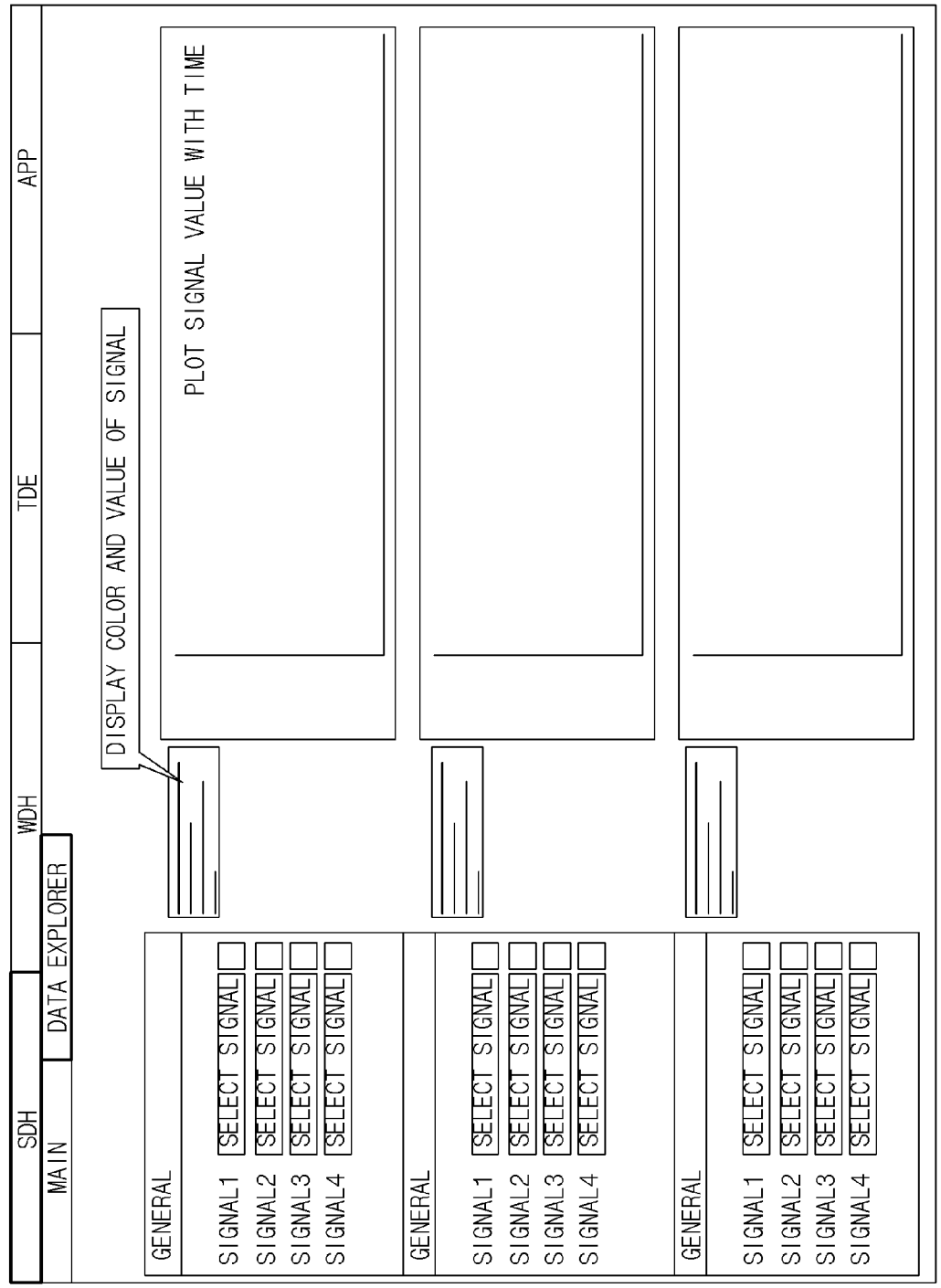

A Synchronous Digital Hierarchy (SDH) module equipped in a vehicle terminal may process controller area network (CAN) data and global positioning system (GPS) data, and SDH MAIN illustrated in FIG. 5 may display a current vehicle position, a route history, and an expectation route by using current position information.

A user may select a specific signal from among output signals of the SDH module equipped in the by using a data explorer on the right of the SDH MAIN and may plot the specific signal to a graph.

A Wavelength Digital Hierarchy (WDH) module equipped in the vehicle terminal may be a module that receives peripheral vehicle information through the WAVE communication and processes the peripheral vehicle information, and as illustrated in FIG. 6*a* and FIG. 6*b*, the first terminal may receive the peripheral vehicle information through UDP communication and may display the peripheral vehicle information.

A Threat Detection Engine (TDE) module equipped in the vehicle terminal may be a logic that informs position information of a tracked vehicle around a user's vehicle and draws a lane, based on the position information. As illustrated in FIG. 7*a* through FIG. 7*c*, the first terminal may receive the position information through UDP communication and may display the position information.

The vehicle information tab 110*c* according to an embodiment of the present invention may display position information of a vehicle, from which a warning message based on a safety service is generated, and a result value signal associated with the safety service.

FIG. 8 is a diagram illustrating a forward collision warning (FCW) service tab which is representatively applied in the safety service. In addition, the vehicle information tab 110*c* according to an embodiment of the present invention may display information about a safety service corresponding to emergency electronic brake light (EEBL), do not pass warning (DNPW), control loss warning (CLW), intersection movement assistance (IMA), and left turn assistance (LTA).

Figure 9:
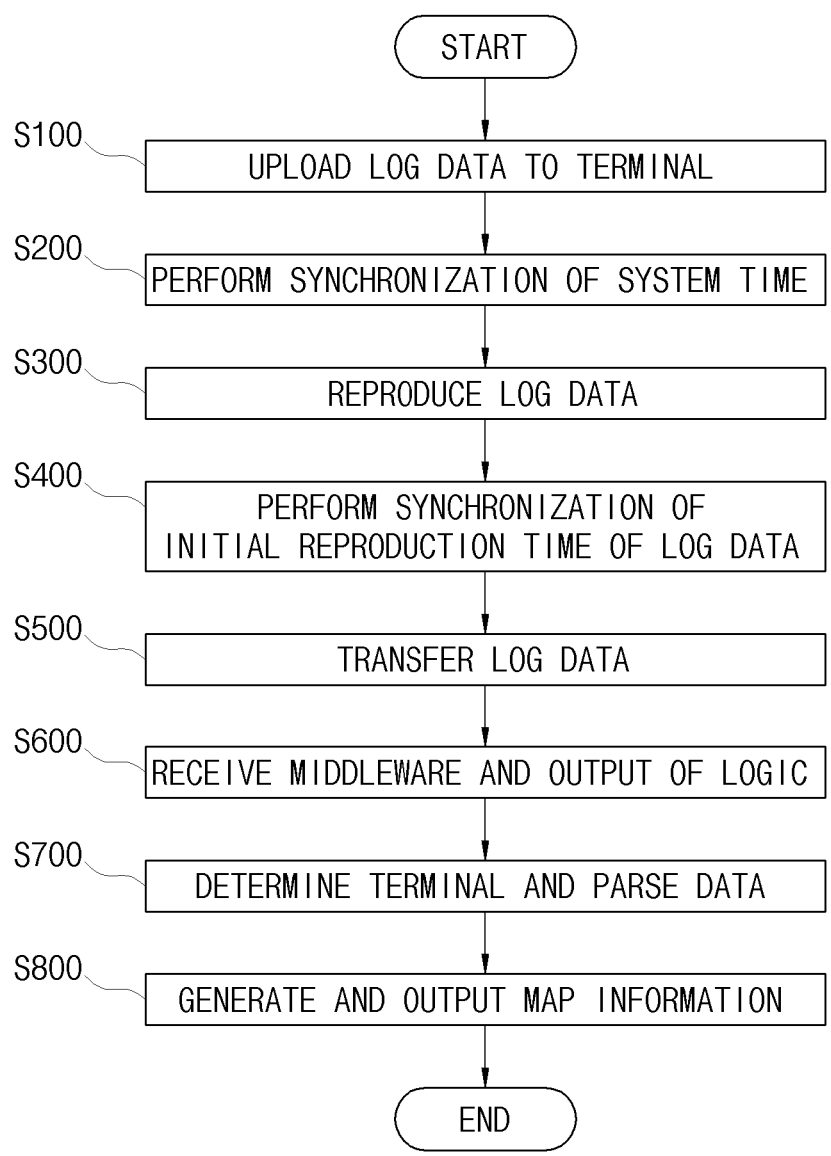
FIG. 9 is a flowchart illustrating an operation of the vehicle-based communication service verification system according to an embodiment of the present invention.

FIG. 9 is a flowchart illustrating an operation of the vehicle-based communication service verification system according to an embodiment of the present invention.

A first terminal which is a Windows PC may receive log data from a V2V vehicle terminal and may upload the log data to a second terminal which is a Linux PC in step S100. The second terminal may synchronize a system time with an NTP server in step S200. When the first terminal reproduces the received log data in step S300, the second terminal may perform synchronization of an initial reproduction time of the log data in step S400. In step S400, with respect to log data having a latest logging start time among pieces of log data, the second terminal may identically adjust reproduction times of the pieces of log data according to a predetermined method. In an embodiment, the second terminal may identically adjust the reproduction times of the pieces of log data to 60 times reproduction time with respect to a logging start time of the log data having the latest logging start time.

Reproduced data may be transferred to V2V vehicle terminals through the UDP communication in step S500. A vehicle terminal may output middleware and an output of a safety service logic, and the first terminal may receive the middleware and the output of the safety service logic in step S600.

The first terminal may determine the V2V vehicle terminal according to UDP IP and may parse each of pieces of data in step S700. The first terminal may generate vehicle information and map information by using a simulation tool, and a display unit of the first terminal may display the vehicle information and the map information.

As described above, the vehicle-based communication service verification system performs a simulation operation of testing the V2X service by using data received from a vehicle terminal in various environments in order to optimize the V2X service to a traffic system, thereby preventing an accident and ensuring stability of the V2X service.

Moreover, according to the embodiments of the present invention, an environment where communication is performed by connecting a plurality of vehicle terminals is provided, and the service verification system is synchronized with one system time.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for controlling a vehicle, the system comprising:
   a first terminal configured to receive log data, and transmit the log data and a reproduction command signal corresponding to the log data; and
   a second terminal configured to
   receive the log data from the first terminal,
   upload the received log data,
   synchronize a system time corresponding to the second terminal,
   synchronize the log data by synchronizing respective initial reproduction times of pieces of the log data to start at a reference point, based on the reproduction command signal and a determination of which piece of the log data among the pieces of the log data has a latest logging start time, and
   transmit the synchronized log data to a vehicle terminal,
   wherein the first terminal is further configured to receive output data transmitted by the vehicle terminal based on the received synchronized log data, and perform a simulation based on the received output data to optimize a Vehicle-to-everything (V2X) service of a traffic system to control a movement of at least one vehicle.

2. The system of claim 1, herein the first terminal is further configured to receive, as the output data, vehicle-to-vehicle communication middleware and data associated with a safety service from the vehicle terminal.

3. The system of claim 1, wherein the first terminal comprises a Windows personal computer configured to upload, through an FTP server, the received log data to the second terminal, which comprises a Linux personal computer.

4. The system of claim 1, wherein the second terminal is further configured to synchronize the system time using an embedded NTP server.

5. The system of claim 1, wherein the respective initial reproduction times of the pieces of the log data are identically adjusted.

6. The system of claim 5, wherein the reference point corresponds to a multiple of a reproduction time of the piece of the log data among the pieces of the log data determined to have the latest logging start time.

7. The system of claim 6, wherein
   the vehicle terminal transmits the output data through middleware, and
   the output data comprises data associated with a safety service.

8. The system of claim 7, wherein
   the first terminal comprises a display, and
   the display is configured to display the output data, and to display a result value based on the output data using a simulation tool.

9. The system of claim 8, wherein the display is further configured to display a setup tab comprising an IP address, a port number, a map information tab, and a vehicle information tab.

10. The system of claim 9, wherein
    the setup tab comprises a command button for transmitting logging data to the second terminal, and
    the setup tab is configured to receive numbers of logging files as data numbers, and to receive system control information.

11. The system of claim 9, wherein the vehicle information tab comprises any one or any combination of any two or more of a tab displaying a current vehicle position, a route history, an expected route, a tab displaying information of peripheral vehicles received through wireless access in vehicular environments (WAVE) communication, and a tab displaying position information of a tracked vehicle around a vehicle.

12. The system of claim 9, wherein the vehicle information tab displays position information of a vehicle from which a warning message based on a safety service is generated, and a result value signal associated with the safety service.

13. The system of claim 1, the second terminal is further configured to receive the reproduction command signal corresponding to the log data through a User Datagram Protocol (UDP), and to identically adjust the respective initial reproduction times of the pieces of the log data, in response to the first terminal transmitting the reproduction command signal corresponding to the log data.

14. The system of claim 13, wherein
    the log data received by the first terminal is received from a V2V vehicle terminal, and
    the first terminal is further configured to reproduce the log data received by the first terminal, and to determine the V2V vehicle terminal according to an IP (internet protocol) of the UDP.

15. The system of claim 1, wherein the V2X service of the traffic system is optimized to prevent accidents through the control of the movement of the at least one vehicle.

16. The system of claim 1, wherein the V2X service of the traffic system is optimized to stabilize the V2X service, which prevents accidents through the control of the movement of the at least one vehicle.

\* \* \* \* \*